US005540321A

United States Patent [19]

Foster

[11] Patent Number: 5,540,321

[45] Date of Patent: Jul. 30, 1996

[54] APPARATUS AND METHOD FOR MOVING OBJECTS

[76] Inventor: Wilbur Foster, 1713 Camp Craft Rd., Austin, Tex. 78746-7319

[21] Appl. No.: 293,881

[22] Filed: Aug. 19, 1994

[51] Int. Cl.[6] .......... B65G 65/02

[52] U.S. Cl. .......... 198/510.1; 198/321; 5/81.1 R

[58] Field of Search .......... 5/81.1; 198/321, 198/510.1, 512; 414/796, 921; 271/218

[56] References Cited

U.S. PATENT DOCUMENTS

| | | | |
|---|---|---|---|
| Re. 28,056 | 6/1974 | Stevens | 5/81.1 |
| 3,418,670 | 12/1968 | Morgan | 5/81.1 |
| 3,827,089 | 8/1974 | Grow . | |
| 3,947,902 | 4/1975 | Conde et al. | 5/81.1 |
| 4,087,873 | 5/1978 | Ohkawa | 5/81.1 |
| 4,327,453 | 5/1982 | Sefton | 5/81.1 |
| 4,502,169 | 3/1985 | Persson | 5/88.1 |
| 4,914,769 | 4/1990 | Kume et al. | 5/81.1 |
| 5,005,232 | 4/1991 | Wright et al. | 5/81.1 |
| 5,147,051 | 9/1992 | Liljedahl | 5/81.1 |
| 5,165,122 | 10/1992 | Phalen | 5/81.1 |
| 5,168,587 | 12/1992 | Shutes | 5/81.1 |
| 5,185,894 | 2/1993 | Bastert et al. | 5/81.1 |
| 5,187,822 | 2/1993 | Merry | 5/86.1 |
| 5,238,350 | 8/1993 | Krieg et al. | 414/296 |
| 5,428,851 | 7/1995 | Shore et al. | 5/81.1 |

*Primary Examiner*—Joseph E. Valenza
*Attorney, Agent, or Firm*—J. Nevin Shaffer, Jr.; Shaffer & Culbertson

[57] ABSTRACT

A means and method for moving objects (10) having a stand (12) and at least one support arm (14) movably connected to the stand (12). At least a pair of counter rotatable shafts (16 and 18) are connected with the support arm (14) and movable belts (20) for moving objects (64, 68) surrounds each counter rotatable shaft (16 and 18) so that an upper and lower surface (38 and 40) are formed by the belt (20) and each surface moves together in the same direction. The moveable belts (20) are movable by means of friction, or by a handle (22), or by some other suitable mechanical or electrical-mechanical means, in a direction that causes the device (10) to gently lift up and incrementally crawl under the object (64, 68) to be moved in one direction and to move out from under the object (64, 68) being deposited when moved in the other direction.

6 Claims, 11 Drawing Sheets

APPARATUS AND METHOD FOR MOVING OBJECTS

BACKGROUND OF THE INVENTION

This invention relates to an improved apparatus and method for moving objects. In a preferred embodiment, the apparatus and method is utilized by a single operator to move patients, that are confined to bed, from one place to another.

Both manual and mechanical means and methods have been known in the art for quite some time for moving heavy objects from one place to another. In a hospital setting, groups of people, typically nurses, are often utilized to move bed-bound patients. Many mechanical devices are also known. A number of prior art patents disclose patient lift and transport devices in which an overhead crane or hoist lifts the patient from the bed. (U.S. Pat. No. 5,147,051 and U.S. Pat. No. 5,187,822). In these devices, a caster-mounted crane or permanently mounted overhead hoist is used to lift a patient in a sling. These devices require the sling to be slid under the patient before the crane is activated. This operation can be difficult or impossible for one person to perform and is also likely to cause discomfort to the patient. A third drawback of these types of devices is that they are relatively expensive.

A second class of device utilizes a soft, underlying pad to allow the patient to be turned while in the bed. These inventions provide mechanical improvement to a technique that has been around since the turn of the century. In the original technique, the patient lay on the turning pad and, when it became necessary to turn the patient, the attendant would pull one side of the pad causing the patient to roll along the long axis of his body away from the direction the pad was pulled. More recent improvements have substituted mechanical force for the force exerted by the attendant. For example, in U.S. Pat. No. 4,502,169, the pad is actually a long strip attached at one end to a feed spool and at another end to a take-up spool. When the patient is to be turned, the take-up spool is mechanically turned, causing the pad/strip to move and turning the patient. A second turning pad variant is disclosed in U.S. Pat. No. 5,168,587. In this invention, the turning pad is wrapped around the patient and connected with straps to form a broad belt around the patient's mid-section. Mechanical torque is then applied to the belt causing both belt and patient to turn.

Yet another variation of the turning pad is the sliding pad, which is placed under the patient to facilitate moving the invalid transitionally from one surface to an adjacent surface. An example is found in U.S. Pat. No. 5,165,122. In this invention, the pad is placed under the patient. Then the edges of the pad are wrapped around the patient and connected together. Handgrips along the sides of the pad allow attendants to slide the patient from one bed onto an adjacent bed or onto another surface.

Still another variant of the basic sliding pad describes a pad consisting of two layers of material that are free to slide relative to each other. The coefficient of friction between these two layers is low, facilitating the sliding action. One such sliding pad is disclosed in U.S. Pat. No. 5,005,232, wherein a lubricant is used to reduce the friction between the inside surfaces of the pad.

A third approach to moving invalid patients is embodied in the turnover bed described in U.S. Pat. No. 3,827,089. In this invention, the bed assembly itself turns over to allow the patient to be deposited onto a separate mattress.

Other devices use the bed sheet itself to hoist the patient, such as shown in U.S. Pat. No. 4,327,453. This invention lifts the patient from his bed by, in effect, making the sheet on which the patient lies into a sling.

In addition to the hazards and discomfort caused by rolling or sliding or turning a sick or injured person, a drawback to the means and methods for moving objects and/or patients known in the art is that a large number of individuals, certainly more than one, are required to accomplish most of them. In a period of downsizing medical staff, this is a severe hardship. Further, most of the prior art devices require lifting the patient to insert a lifting means underneath the patient, which is extraordinarily difficult for one person to accomplish and can be extremely painful for patients in delicate conditions. A still further drawback is that prior art devices utilizing the sheet as a lifting means do not enable the user to remove the soiled sheet itself.

Thus, there is a need in the art for providing a means and method which enables a single person to effectively move heavy objects such as patients, without having to first roll, turn, or slide the patient, and further, while enabling a single user to lift the patient clear of the bed so that the bed linen can be changed subsequent to the move. It, therefore, is an object of this invention to provide an improved means and method for lifting objects, that can be operated by a single person, without need for rolling, turning or sliding the object first, thereby also enabling the retrieval, cleansing and replacement of associated linens, for example.

SHORT STATEMENT OF THE INVENTION

Accordingly, the apparatus for moving objects of the present invention includes a stand having at least one support arm movably connected to the stand. At least a pair of counter rotatable shafts are connected with this support arm and a movable belt means for moving objects surrounds each counter rotatable shaft so that an upper and lower surface is formed and each surface moves in the same direction. Further, a means for moving the counter rotatable shafts and associated movable belt means, such as a handle or electric motor or the like, is provided. In one embodiment, the support arm includes a pair of oppositely positioned support tubes adapted to contain the ends of the counter rotatable shafts. The counter rotatable shafts are connected so that when the means for moving the shafts, the handle for example, is operated, the shafts rotate in opposite directions. Also, in a preferred embodiment, the movable belts are divided into four separate belt sections for ease of maintenance and manufacture.

A method for moving objects and/or patients is also disclosed and includes the steps of constructing the stand and connecting a support arm to it such that the support arm may be moved up and down vertically on the stand to accommodate various object heights. At least a pair of counter rotatable shafts are connected, next, to the support arm and a movable belt means for moving the objects is added so that one belt surrounds each counter rotatable shaft so that an upper and lower surface is formed and each surface moves in the same direction. Another step involves adding a means for moving the counter rotatable shafts and associated movable belt means and, then, operating the moving means so that objects are lifted onto or lowered off of the movable belt.

BRIEF DESCRIPTION OF THE DRAWINGS

Other objects, advantages, and features of the present invention will become more fully apparent from the following detailed description of the preferred embodiment, the appended claims and the accompanying drawings in which:

FIG. 8 shows the invention in position on the bed next to the patient;

FIG. 9 shows the invention moved under the patient;

FIG. 10 shows the patient raised on the invention off of the bed;

FIG. 11 shows the patient moved away from the bed on the invention;

FIG. 12 shows the patient being moved back over the bed to reverse the steps shown in FIGS. 7–11;

DETAILED DESCRIPTION OF THE PREFERRED EMBODIMENT

Figure 1:
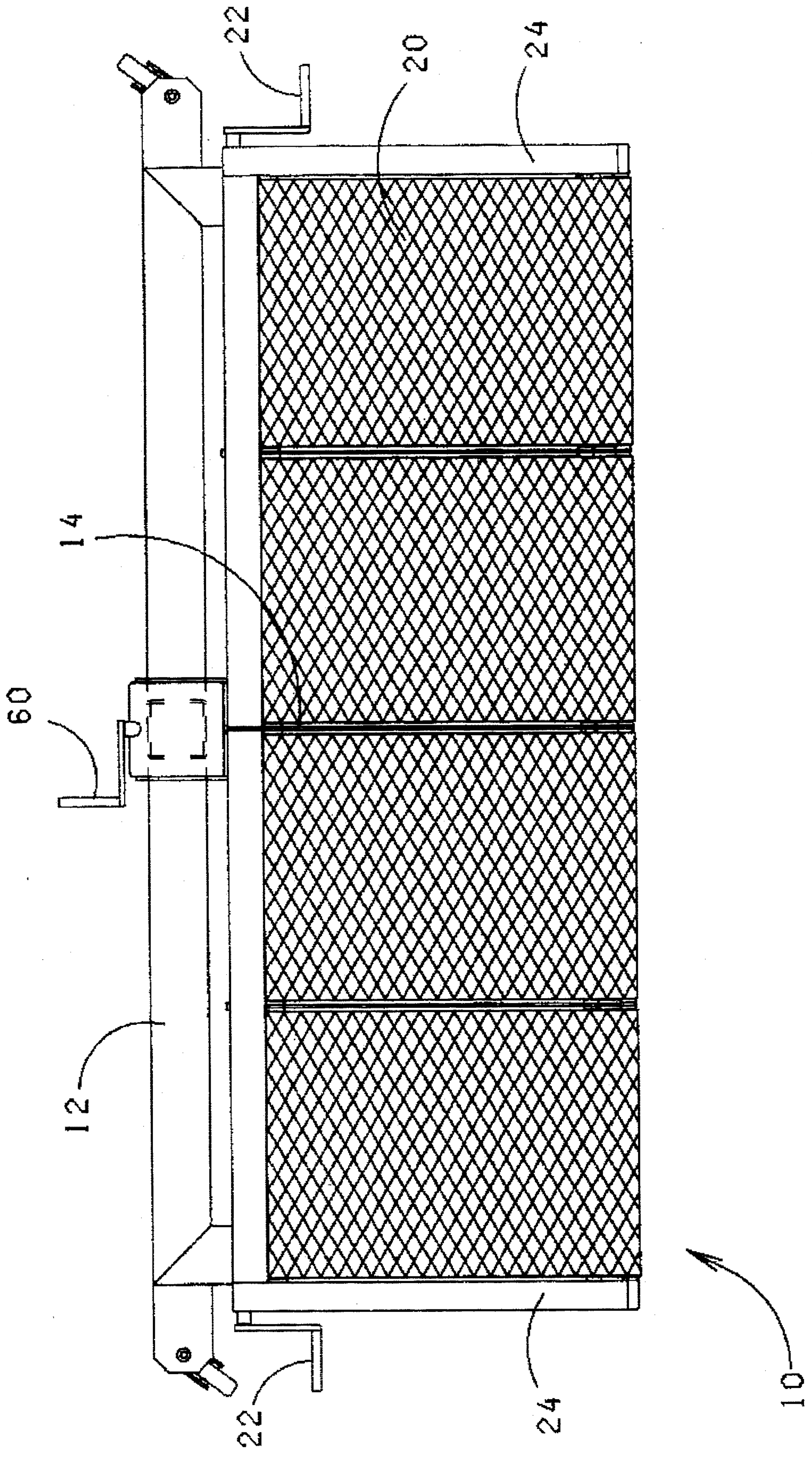
FIG. 1 is a top view of a preferred embodiment of the apparatus for moving objects of the present invention.
Figure 2:
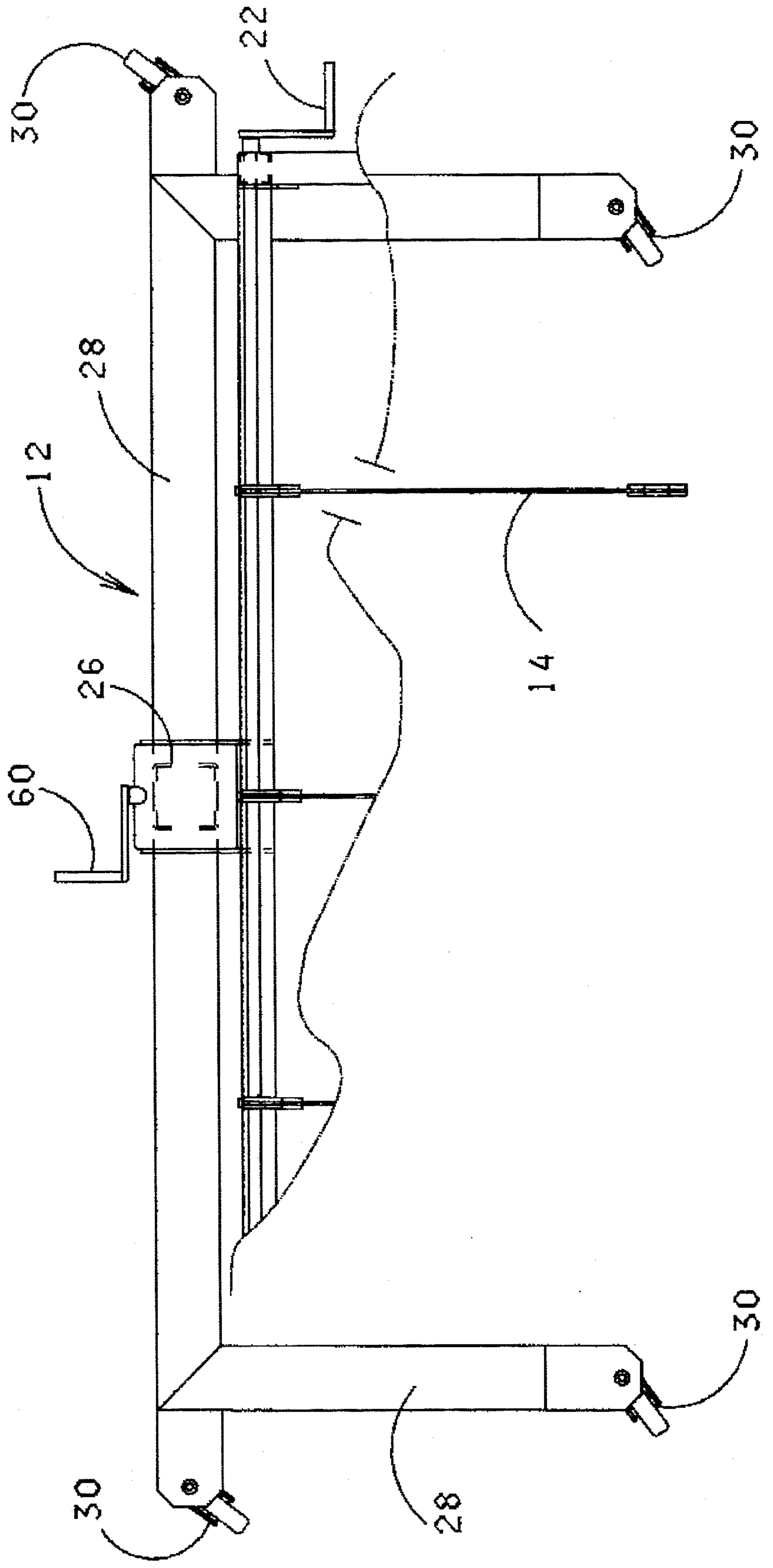
FIG. 2 is a top cut away view of FIG. 1.

The preferred embodiment of the present invention is illustrated by way of example in FIGS. 1–17. With specific reference to FIGS. 1–6, an object mover 10 includes a stand 12 in the form, as seen from the side, of a L shape to which is movably connected at least one support arm 14 (three are shown in FIGS. 1 and 2). A pair of counter rotatable shafts 16 and 18 are connected to the support arm 14. A movable belt 20 encompasses each rotatable shaft 16 and 18. Further, a means for moving the counter rotatable shaft, handle 22, is shown. A pair of end support tubes 24 is shown, within which is located the ends of counter rotatable shafts 16 and 18. Support tubes 24 help support the movable belts 20 against side to side motion.

Referring now to FIG. 2, stand 12 consists of upright vertical section 26 and horizonal sections 28. Horizonal sections 28 have casters 30 that enable movement.

Figure 3:
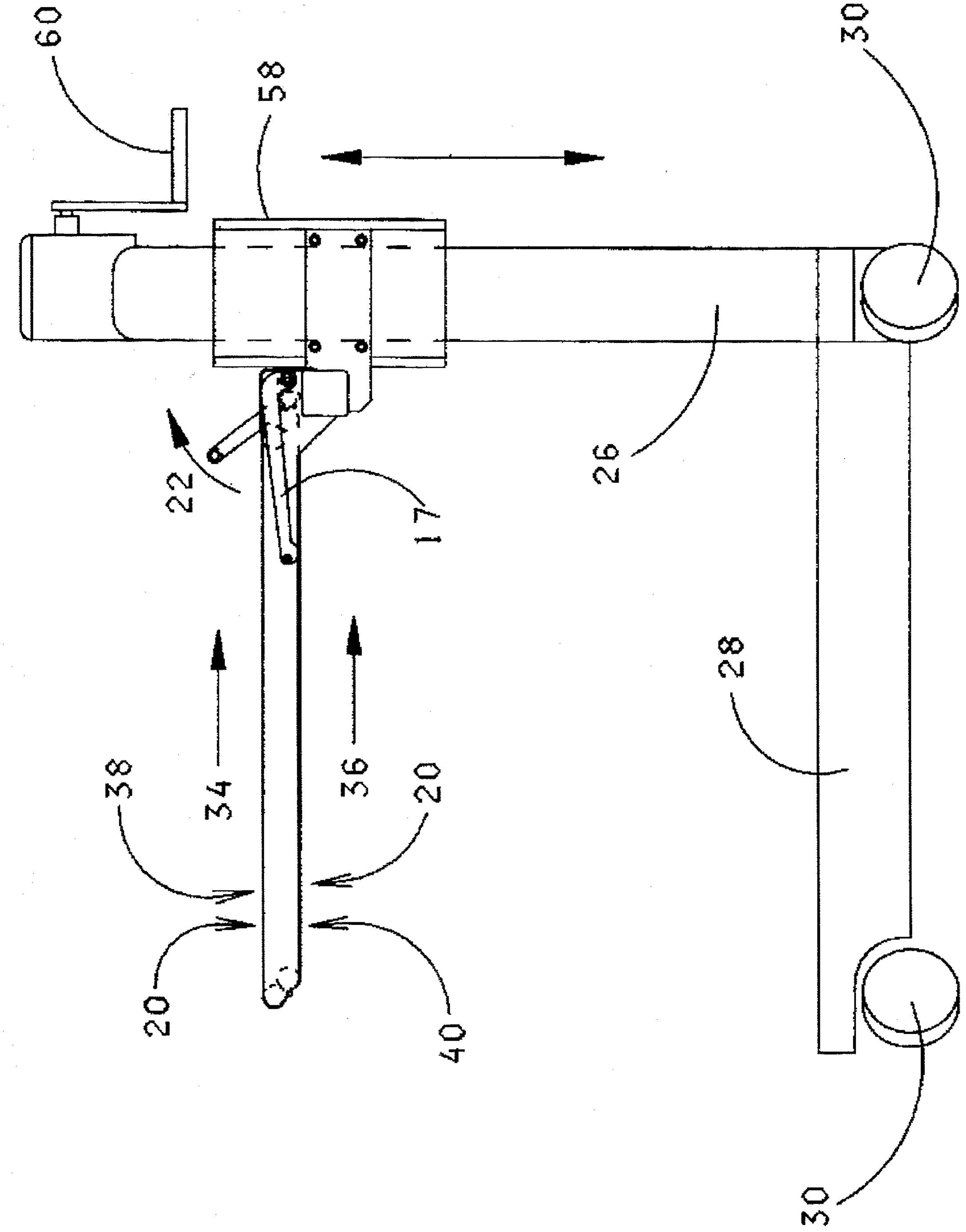
FIG. 3 is a side view of FIG. 1.

FIG. 3 shows arrows 34 and 36 which indicate that the top surface 38 of a movable belt 20 and the bottom surface 40 of an identical movable belt 20 both move in the same direction when moved, such as when handle 22 is turned. It should be noted that the direction of arrows 34 and 36 will be reversed upon reversing the direction of movement of object mover 10 and/or handle 22.

Figure 4:
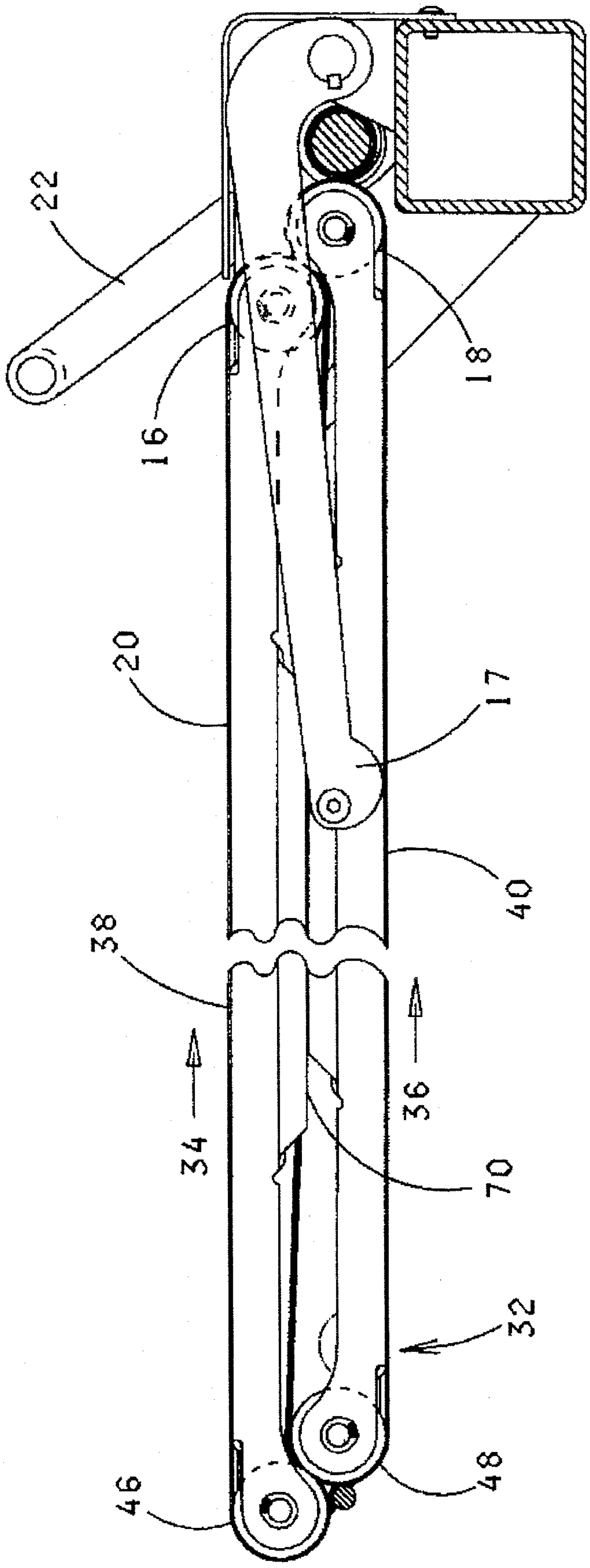
FIG. 4 is a side view of the belt and tray support of the invention of FIG. 1.
Figure 5:
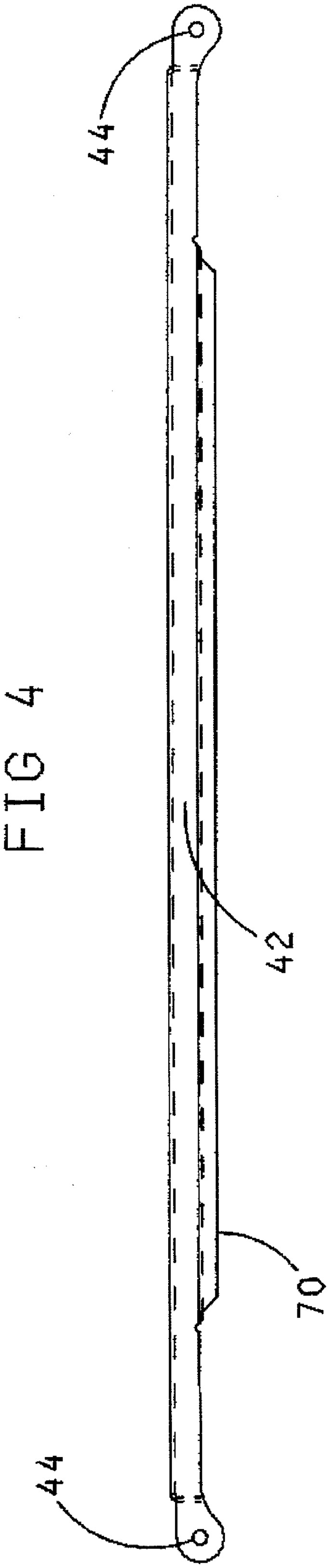
FIG. 5 is a side view of a single tray section of the invention of FIG. 1.

Referring now to FIGS. 4 and 5, an enlarged view of tray support 32 is shown. Tray units 32 support the object to be moved and fix the belts and rollers in position. In a preferred embodiment tray units 32 are comprised of four pairs of independent trays 42 (see FIGS. 5, 16 and 17) with axle/connecting holes 44 in each end. Axle/connecting holes 44 are used to retain and support counter rotatable shafts 16 and 18 and idler rollers 46 and 48, as well as connecting four pairs of independent trays 42. Independent trays 42 are held in place between shafts 16 and 18 and rollers 46 and 48 by means of locking arm 17, described more fully hereafter.

Figure 6:
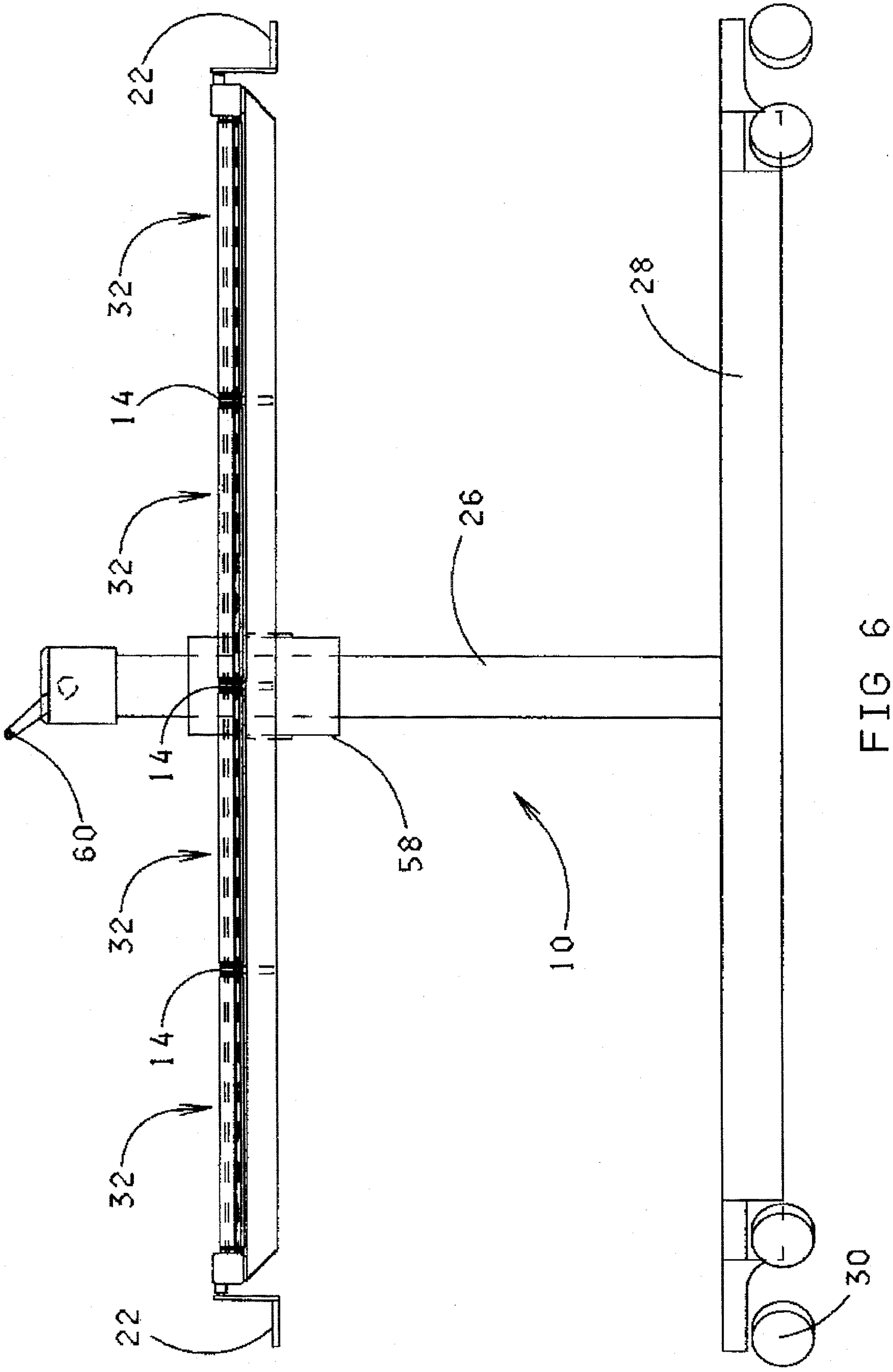
FIG. 6, is a front view of FIG. 1.

The front view shown in FIG. 6, shows object mover 10 in a preferred embodiment with four separate sections formed from three support arms 14 and four pair of tray units 32. Also shown is guide unit 58 which surrounds vertical section 26 and to which is attached to a central support arm 14. Guide unit 58 assures smooth incremental movement up and down vertical section 26 by means of vertical lift crank 60 and security against movement at the chosen height and may be constructed in any manner known in the art to do so.

Figure 7:
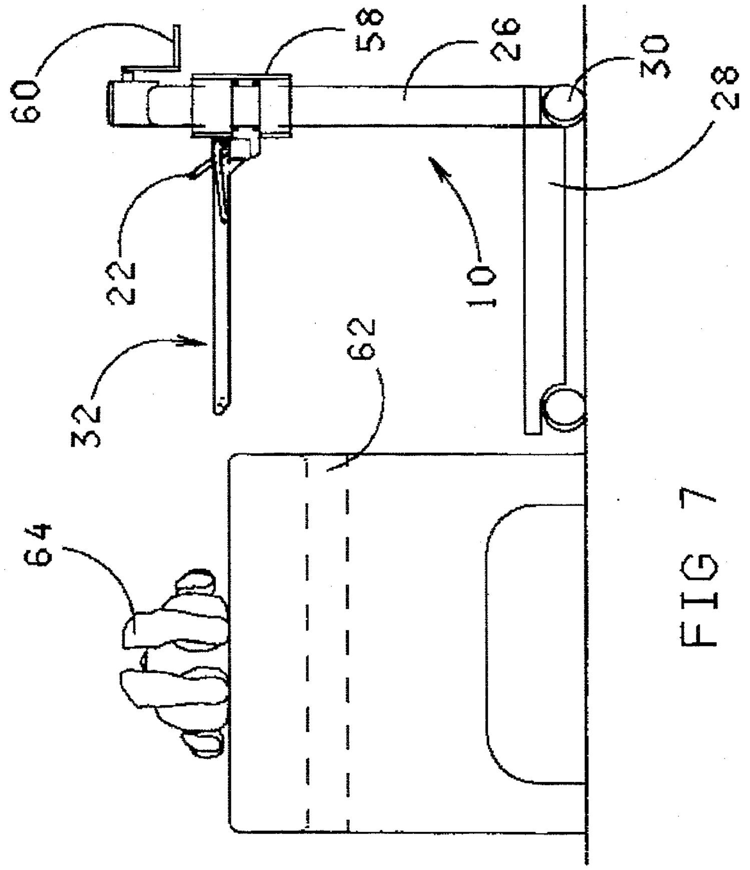

Referring now to sequential FIGS. 7 through 12, object mover 10 is shown in FIG. 7 in position next to bed 62, upon which bed 62 patient 64 is resting. FIG. 7 also shows vertical lift crank 60 which enables support arm 14 to be raised to the level appropriate for use with bed 62. Certainly, any appropriate substitute known in the art for the manual lift crank 60, or handle 22 for that matter, may be utilized, such as an electrical winch and so forth.

Figure 8:
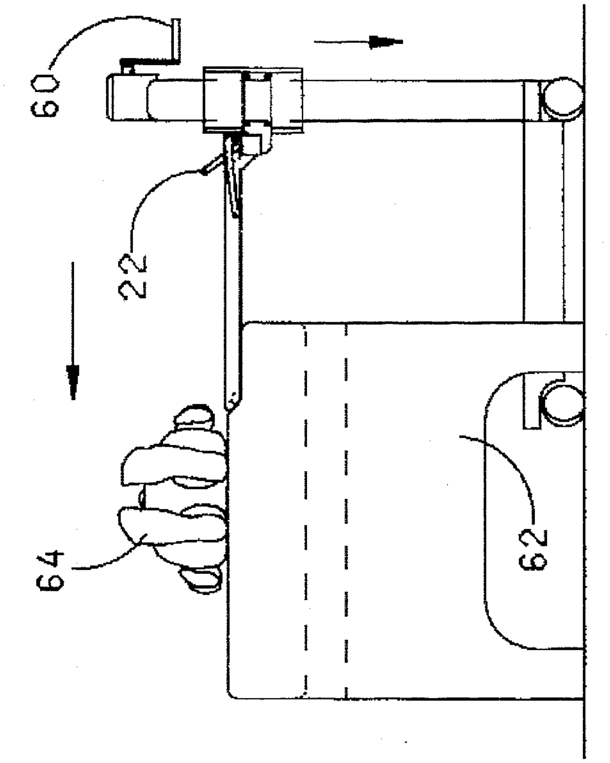
FIGS. 7–12 are sequential views illustrating the operation of the invention for moving objects, such as patients, FIG. 7 showing the initial position of the patient and the invention.

FIG. 8 illustrates object mover 10 moved in the direction of the arrow into position on bed 62 and lowered so that support arm 14 depresses bed 62 next to patient 64. Handle 60 is rotated to depress bed 62 slightly. In this position handle 22 is rotated so that counter rotatable shafts 16 and 18 are rotated to produce movement of movable belt 20, top surface 38 and bottom surface 40, in the direction of arrows 34 and 36 (shown in FIG. 3). This action causes patient 64 to be gently lifted up and moved onto the upper movable belt 20 (shown in FIG. 9) as the object mover 10 essentially crawls underneath the patient 64.

Figure 9:
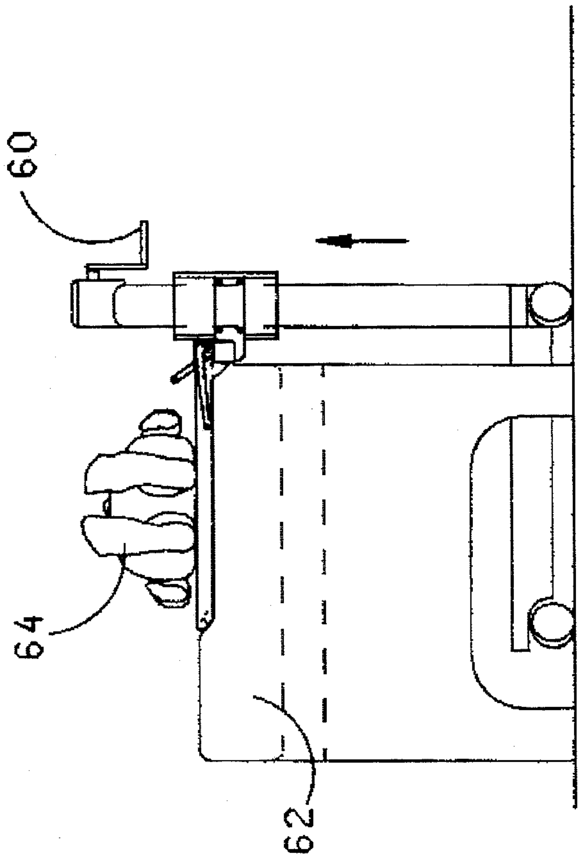

Referring to FIG. 9, once patient 64 is on the upper movable belt 20 and supported by tray units 42 and support arms 14, vertical lift crank 60 is utilized to raise the patient above the bed 62.

Figure 10:
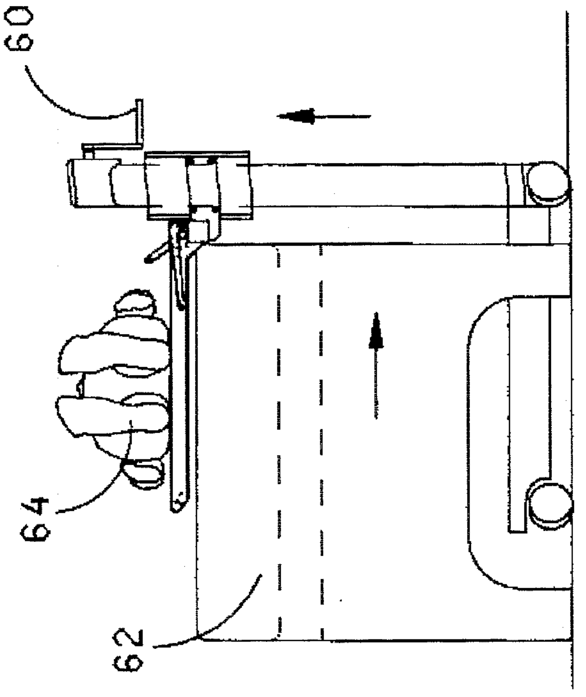

Referring to FIG. 10, it is shown that the object mover 10, with the patient 64 supported by support arms 14, is now free to move to any other location. Of importance is the fact that the linen on bed 62 is not used to move the patient 64 and may now be removed and cleaned without disturbing the patient 64.

Figure 12:
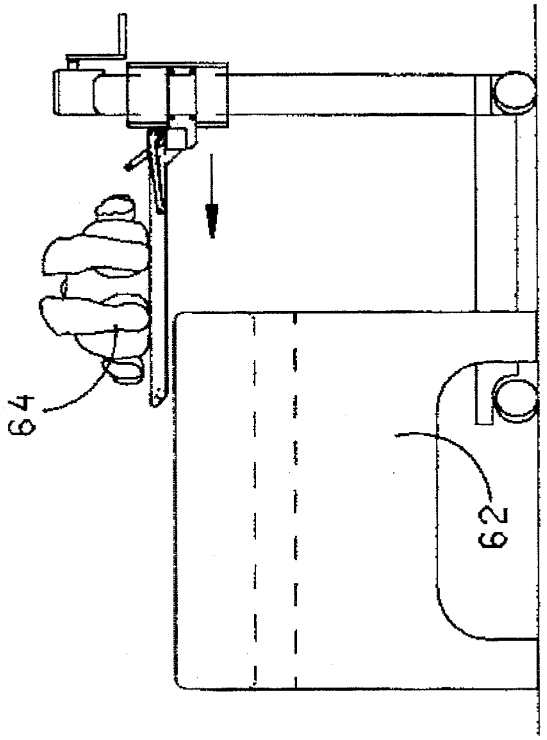
Figure 11:
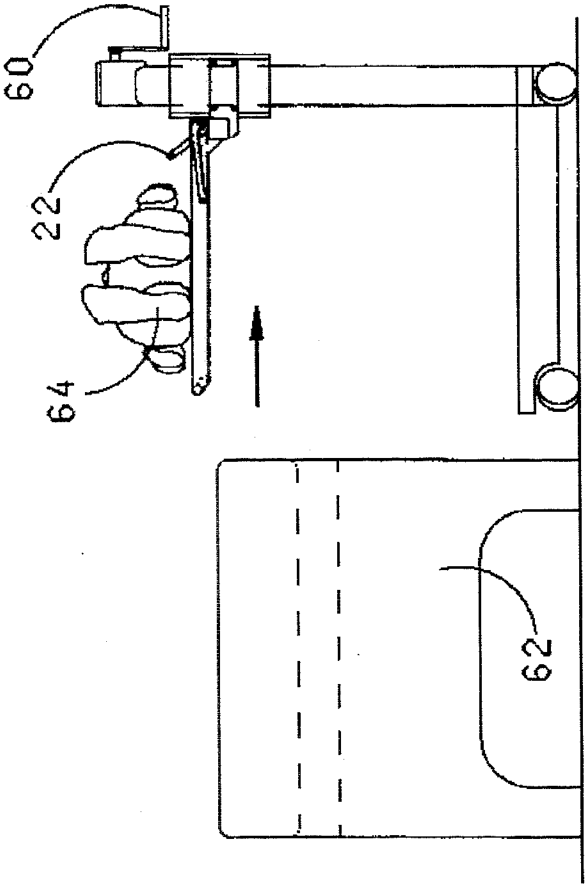

Referring to FIGS. 11 and 12, once the patient 64 has been treated, observed, X-rayed, or so forth, object mover 10 can be used to place the patient 64 back on the bed 62, or at any of these previously described locations, simply by reversing the removal process. FIG. 12 shows that the support arms 14 is being moved over bed 62 and, once in place, by reversing the direction of handle 22, the patient 64 will be lowered onto and left on the bed 62 as the object mover 10 essentially crawls out from underneath patient 64. This is because by reversing the direction of handle 22, the movable belts 20 will reverse from the direction shown in FIG. 3 and the patient 64 will be moved off of upper movable belt 20.

Figure 13:
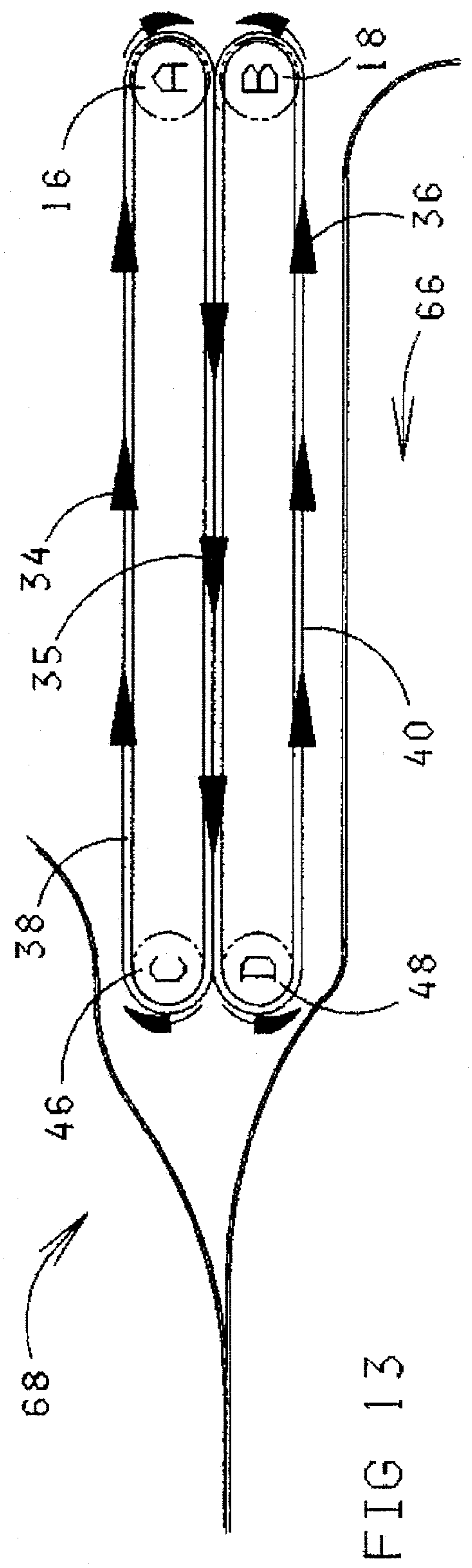
FIG. 13 is a side view of a preferred embodiment of the rollers of the invention of FIG. 1.

Referring now to FIG. 13, the simplest embodiment of the invention is illustrated. Counter rotatable shaft 16, labeled "A" and counter rotatable shaft 18, labeled "B" are positioned directly above and below one another. Idler roller 46, labeled "C" and idler roller 48, labeled "D" are similarly positioned. Pressing belt A–C and belt B–D together creates top surface 38 and bottom surface 40. By rotating rotatable shafts 16 and 18, or obviously, rollers 46 and 48, or simply by pushing object mover 10 forward while the belt B–D is held in contact with a base 66, which could be bed 62, results in belt A–C rotating in the opposite direction and at the same surface speed. The result is that the object mover 10 moves between object 68, which could be patient 64, and the base 66 without causing the object 68 to move in any horizonal direction in relation to base 66. Further, there is no relative movement between the surface of the object 68 and the surface 38 of belt A–C, or between the surface of base 66 and the bottom surface 40 of belt B–D. The object 68 is simply gently and incrementally lifted up to the height of the unit height of the object mover 10, comprised of the pair of rotatable shafts 16 and 18 and rollers 48 and 46. It should be noted that while the top surface 38 and the bottom surface 40 are moving in the direction of the arrows 34 and 36, i.e. both in the same direction, the interior of the two belts is moving together in the opposite direction shown by arrow 35. Simple friction caused by pressing the rollers together can cause the belts to rotate together or they could be moved by means of gears, chains, sprockets, or other means known in the art.

Figure 14:
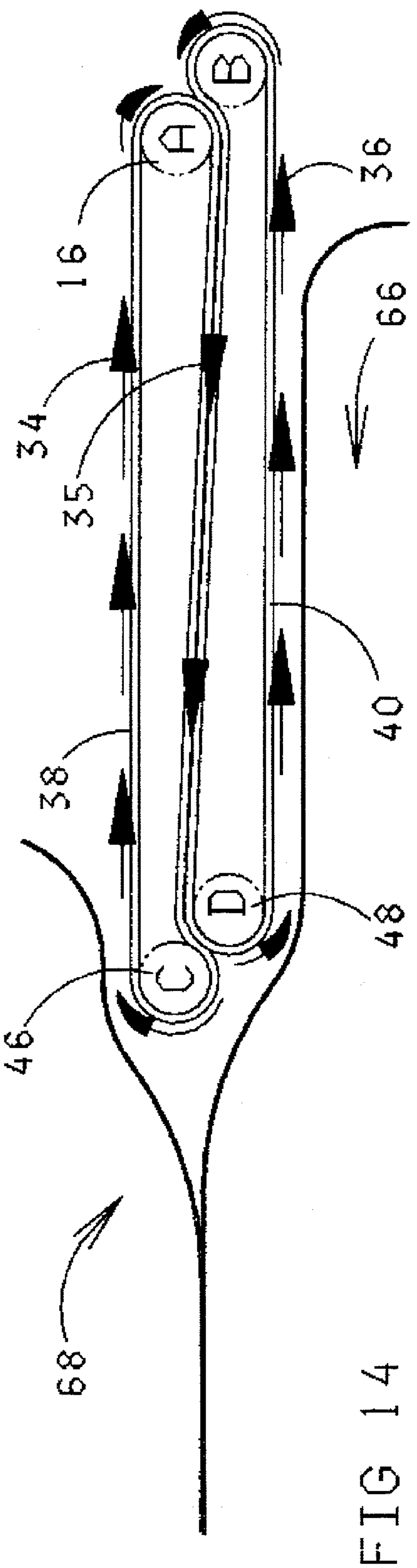
FIG. 14 is a side view of another embodiment of the rollers of the invention of FIG. 1 compacted to reduce the height.
Figure 15:
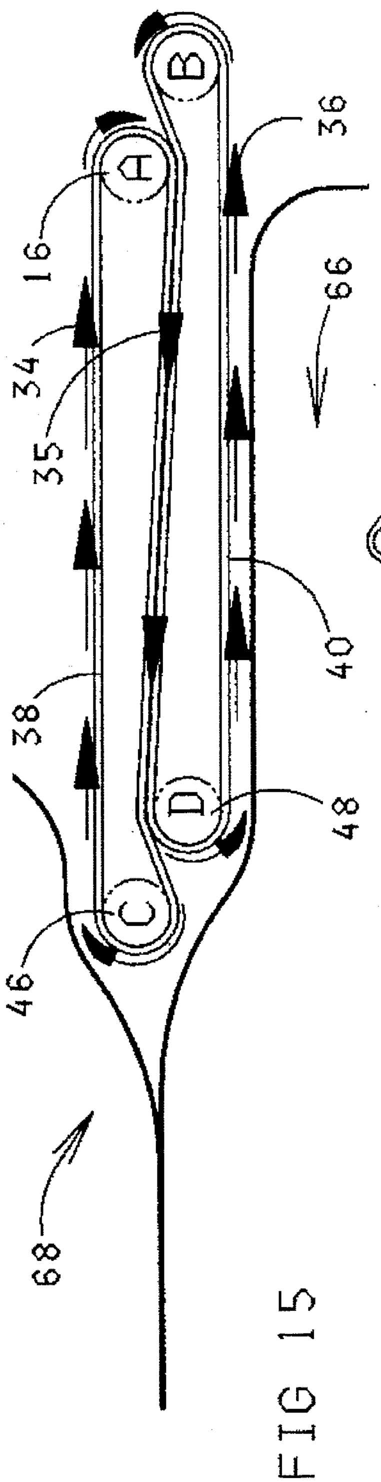
FIG. 15 is a side view of another embodiment of the rollers of the invention of FIG. 1 separated and requiring driving means, such as chain and sprockets.

Referring to FIG. 14, the relative positions of the rotatable shafts and the idler rollers are shown in a configuration designed to reduce the overall height of the object mover 10 shown in FIG. 13. FIG. 15 shows the rotatable shafts and idler rollers separated some distance so that they can accommodate and be driven by gears, chains, and sprockets, or other means known in the art.

Figure 16A:
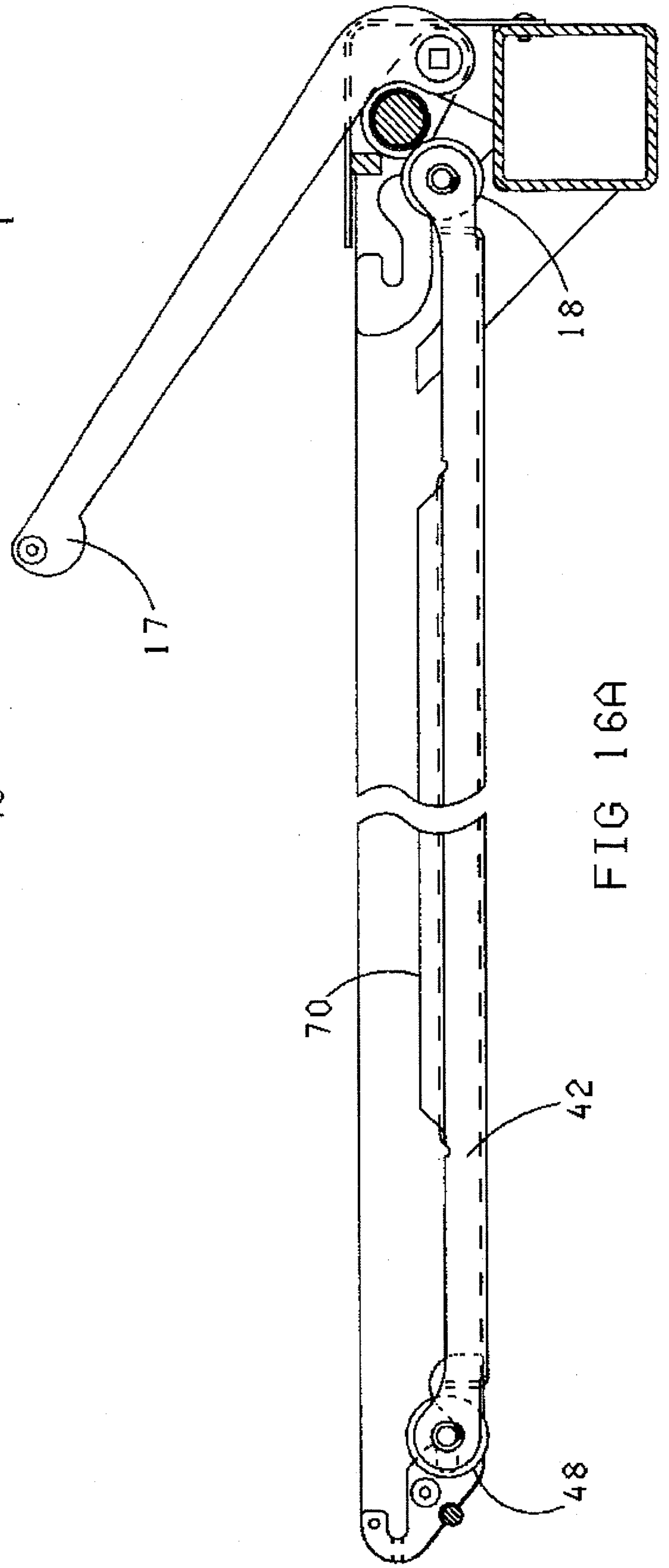
FIG. 16A is a side view of the lower independent tray showing it placed into the support arm.

Referring now to FIGS. 16 A and B and 17, FIG. 16A is a side view of the lower independent tray 42, around which Belt B–D (not shown) is placed. One of the two side edges 70 of independent tray 42 is also shown. Once lower independent tray 42 is in place and encompassed by a movable belt 20 (not shown), it is ready to receive an upper tray 42.

Figure 16B:
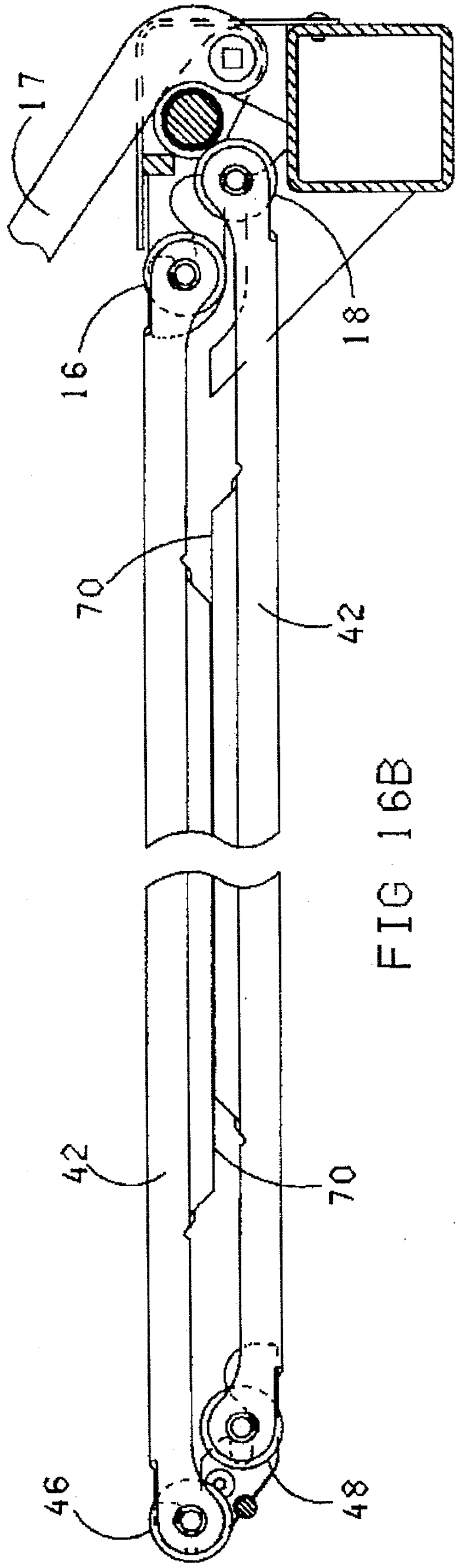
FIG. 16B is a side view of the upper independent tray showing it placed into the support arm on top of the lower tray.
Figure 17:
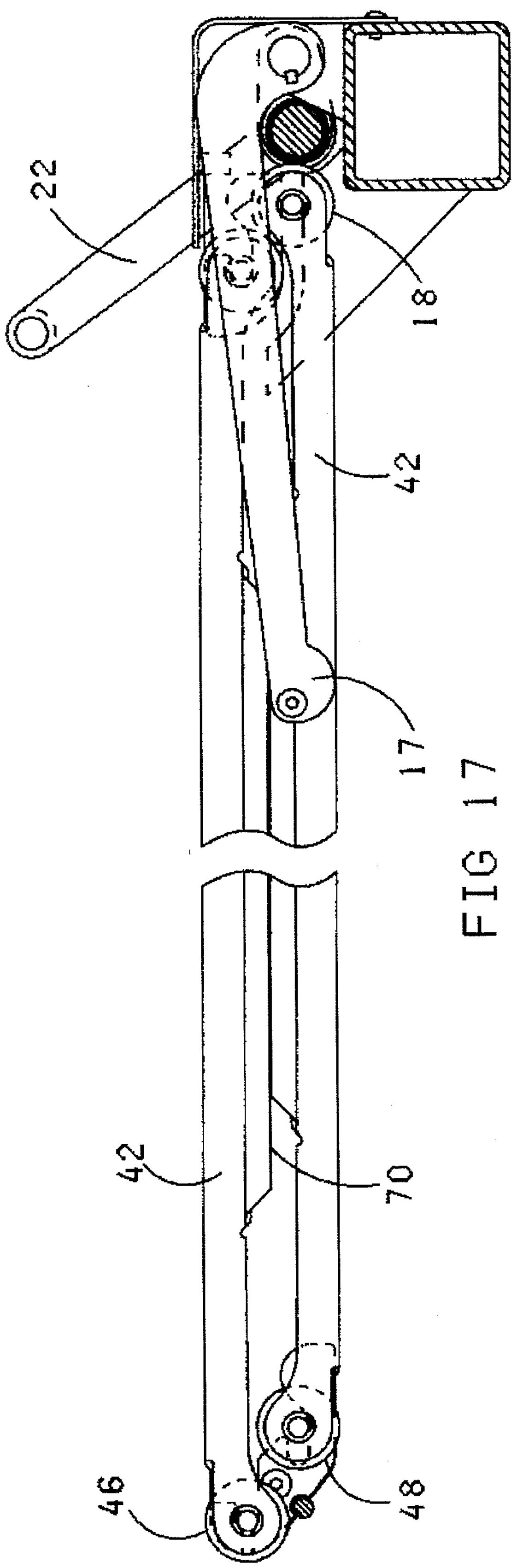
FIG. 17 shows locking arm 17 lowered and causing the upper and lower trays to be pressed into contact with the driving shaft and each other.

Referring now to FIG. 16B, upper independent tray 42 is shown, which is identical to lower independent tray 42, but turned upside down. As a result, the two side edges 70 are also present on upper independent tray 42 and cooperate with the lower independent tray 42 edges 70 to provide solid contact between the two trays and, resultantly, rigidity and support to each movable belt section. Once independent tray 42 is wrapped in belt A–C (not shown) and is pressed into horizontal position, locking arm 17 is lowered, thereby tensioning counter-rotatable shaft 16 and idler rollers 46 in the horizontal position and also pressing upper independent tray 42 against lower independent tray 42, as shown in the figures. Additionally, locking arm 17 serves to hold upper belt A–C and lower belt B–D in contact with each other. As a result, the combination of rollers illustrated in FIGS. 13–14, for example, is provided in a manner that enables them to be held horizontal and to cooperate with movable belts 20 and tray units 32 in the support of objects 68 and/or patent 64. Additionally, the ability to replace worn belts and provide maintenance and repair is also thereby provided by the two piece tray units 32.

In operation, object mover 10 can be utilized to move any object and, in particular, objects that would be difficult for a single person to move. In the medical business, for example, the movement of patients for other treatment or to clean the bed linen, and so forth, can be accomplished by a single person using object mover 10. The means and method for so doing include the utilization of support arms 14 connected to stand 12, the support arms 14 being movable in a vertical direction by means of vertical lift crank 60. Once the correct height has been determined, the stand 12 is rolled up next to patient 64 or any other object to be moved. By utilizing vertical lift crank 60, the support arms 14 can be used to depress the bed 62 so that the device comes in contact next to and/or slightly underneath patient 64. At that point, handle 22 can be utilized to move movable belts 20 in the direction of arrows 34 and 36 in FIG. 3 so that the support arms 14 and tray units 32 essentially crawl underneath and gently lift the patient up and onto the top surface 38 of upper belts 20. At this point, the patient or object may be delivered to any location in the hospital, or elsewhere, where his/her presence is needed, or simply left there while the bed linen is changed, for example. Once the linen is changed, or the required procedure is accomplished, the patient can be deposited on the bed 62 by reversing the above-described process.

While the object mover of the present invention has been disclosed in connection with utilization with hospital patients in particular, it should be appreciated that the object mover can be used in other situations. The present invention provides an improved means and method for moving any object by a single person. The counter rotatable shafts and moveable belt combination enable a single person to move heavy objects safely and securely. Thus, the object mover of the present invention has the important advantage of providing a safe means for a single person to move heavy objects.

While the present invention has been disclosed in connection with the preferred embodiment thereof, it should be understood that there may be other embodiments which fall within the spirit and scope of the invention as defined by the following claims.

I claim:

1. In an object moving apparatus of the type having a vertical and horizontal support stand and at least one support arm for supporting at least a pair of counter-rotating shafts in combination with at least a pair of endless belts, the endless belts attached one oft top of the other so that they are engaged in the middle by friction and so that the exposed upper surface of the upper belt and the exposed lower surface of the lower belt move in the same direction when the upper and lower belts are moved, the improvement comprising:

a) a pair of support trays, upper and lower, identical to each other and each conformed to receive an idler roller and a rotatable shaft;

b) the lower tray attached to the support arm and a lower endless belt attached over the idler roller and rotatable shaft;

c) the upper tray with an upper endless belt attached over the idler roller and rotatable shaft, inverted and placed on top of the lower tray; and d) a lock for locking the upper tray in place on top of the lower tray, tensioning both upper and lower belts and compressing the interior portions of the upper and lower belts together, the combined upper and lower trays forming a rigid support for the exposed upper surface of the upper belt and the exposed lower surface of the lower belt and support for the object to be moved.

2. The apparatus of claim 1 wherein the upper and lower trays further comprise:

a) rigid side edges that meet as the upper and lower trays are locked together so that the combination forms a rigid unified object support; and b) axle connecting holes so that the idler rollers and rotatable shafts are movably connectable to the upper and lower trays.

3. The apparatus of claim 2 further comprising a means for moving the upper and lower endless belts at the same time.

4. The apparatus of claim 2 further comprising a pair of oppositely positioned support tubes encompassing the upper and lower support trays so that the support trays resist side-to-side motion.

5. A method for moving objects comprising the steps of:

a) construction a vertical and horizontal support stand;

b) connecting at least one support arm to the stand so that the support arm is moveable in relation to the stand;

c) providing a pair of support trays, upper and lower, that are identical to each other and wherein each is conformed to receive an idler roller and a rotatable shaft;

d) attaching the lower tray to the support arm and attaching a lower endless belt over an idler roller and rotatable shaft;

e) attaching an idler roller and rotatable shaft to the upper tray and attaching an upper endless belt over the idler roller and rotatable shaft and inverting the upper tray and placing it on top of the lower tray;

d) providing a lock and locking the upper tray in place on top of the lower tray, tensioning both upper and lower belts and compressing the interior portions of the upper and lower belts together, so that the combined upper and lower trays form a rigid support for an exposed upper surface of the upper belt and an exposed lower surface of the lower belt and provides support for the object to be moved;

e) moving the upper and lower belts so that an object to be moved is moved either onto or off of the exposed upper surface as the exposed lower surface moves under or out from under the object to be moved.

6. The method of claim 5 further comprising the steps of:

a) creating rigid side edges in the upper and lower trays that meet as the upper and lower trays are locked together so that the combination forms a rigid unified object support; and b) providing axle connecting holes so that the idler rollers and rotatable shafts are movably connectable to the upper and lower trays.

* * * * *

UNITED STATES PATENT AND TRADEMARK OFFICE

CERTIFICATE OF CORRECTION

PATENT NO. : 5,540,321

DATED : July 30, 1996

INVENTOR(S) : Wilbur Foster

It is certified that error appears in the above-identified patent and that said Letters Patent is hereby corrected as shown below:

In Claim 1, Column 6, Line 40, change "one oft top" to --one on top--.

Signed and Sealed this

Twelfth Day of November, 1996

Attest:

Bruce Lehman

BRUCE LEHMAN

*Attesting Officer* *Commissioner of Patents and Trademarks*